United States Patent [19]

Reeder

[11] 4,022,448
[45] May 10, 1977

[54] VEHICLE SUSPENSION UNIT AND METHOD OF ASSEMBLY THEREOF

[76] Inventor: Lehan James Reeder, 4880 Haddington, Bloomfield Hills, Mich. 48013

[22] Filed: Dec. 5, 1975

[21] Appl. No.: 637,854

[52] U.S. Cl. .............................. 267/8 R; 188/322; 188/269; 29/522; 267/35; 267/64 B
[51] Int. Cl.² .......................................... F16F 9/08
[58] Field of Search ............ 267/8 R, 34, 35, 64 R, 267/64 B; 188/269, 289, 315, 322; 29/520, 522, 526, 516, 521

[56] References Cited
UNITED STATES PATENTS

| | | | |
|---|---|---|---|
| 1,107,714 | 8/1914 | Sharp | 267/35 |
| 2,149,040 | 2/1939 | Binder et al. | 267/8 R |
| 3,042,392 | 8/1962 | Schmitz et al. | 267/64 B |
| 3,046,001 | 8/1962 | Schultze | 267/64 B |
| 3,046,002 | 8/1962 | Schmitz | 267/64 B |
| 3,744,123 | 8/1973 | Vers | 29/520 |

*Primary Examiner*—James B. Marbert
*Attorney, Agent, or Firm*—Everett R. Casey

[57] ABSTRACT

A supplementary air spring unit suitable for user installation on a damper or shock absorber having a generally cylindrical body in which one bead end of a resilient tubular rolling-lobe boot is removably sealingly secured on the shock absorber body by a sleeve retained in place by the air pressure in the unit and in which the other beaded end of the boot is removably sealingly pinched between a master cap and an external shell, with the shell and bead being removably retained in position by a fastening means on the cap.

20 Claims, 3 Drawing Figures

VEHICLE SUSPENSION UNIT AND METHOD OF ASSEMBLY THEREOF

BRIEF SUMMARY OF THE INVENTION

This invention relates to the field of combined shock absorbers and air spring units. The advantages of such combined units are known, understood and appreciated. The present invention relates to a kit for adapting and existing available shock absorber to utilization as a combined shock absorber and air spring unit, the conversion being performable either by a manufacturer or by the ultimate user. The parts are designed and arranged to facilitate simply assembly to an existing shock absorber as well as simply disassembly for rebuilding of the air spring assembly, if that ever proves necessary, or for utilization of the air spring assembly on a different or replacement shock absorber if desired.

DETAILED DESCRIPTION

Figure 1:
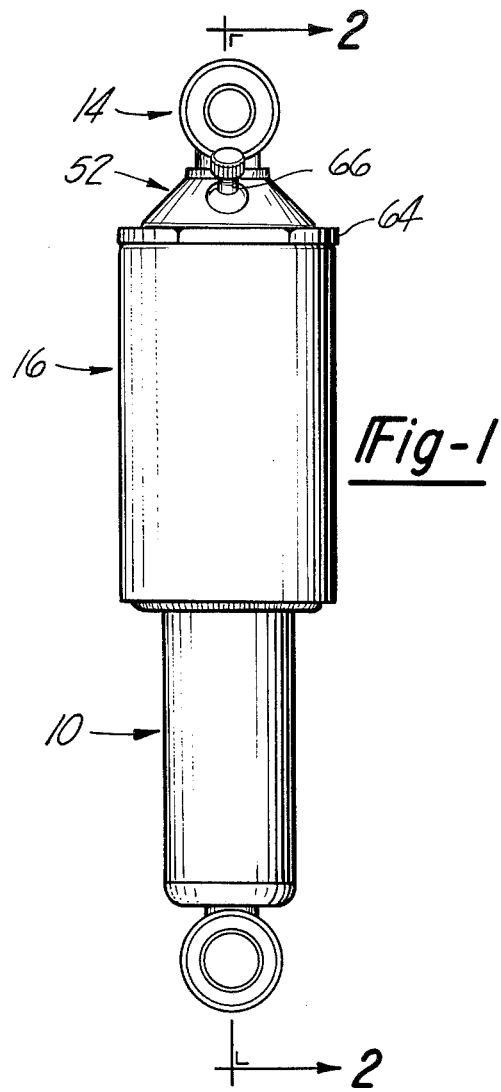
FIG. 1 is an elevational view of a combined shock absorber and air spring unit embodying certain of the principles of the present invention.

The assembly as illustrated in FIG. 1 of the drawings comprises a shock absorber 10 having lower and upper attachment means 12 and 14. An air spring subassembly 16 surrounds and cooperates with a portion of the shock absorber 10.

Shock absorber 10 is intended to represent any of a variety of commercially available shock absorbers which are not specially designed to serve as elements of a shock absorber-air spring combination. Such shock absorbers are well known and available and are adapted to be connected, through attachment means 12 and 14, between the sprung and unsprung masses of a vehicle, such as a motorcycle.

The shock absorber 10 includes a body 18, integral with the lower attachment means 12, and a piston rod or shock shaft 20 which cooperates with a conventional internal piston so as to be movable relative to body 18, with the shock absorber tending to control those relative movements. Piston rod 20 has an upper threaded end 22 accepting a shock lock nut 24, serving as a shoulder portion, and accepting the attachment portion 14 which is illustrated to be in the form of a customary top eye having a tapped bore to threadedly accept the threaded end of the piston rod 20. It will be appreciated that in normal usage of the shock absorber, as such, shock lock nut 24 would be in abutment with the top eye 14.

Figure 2:
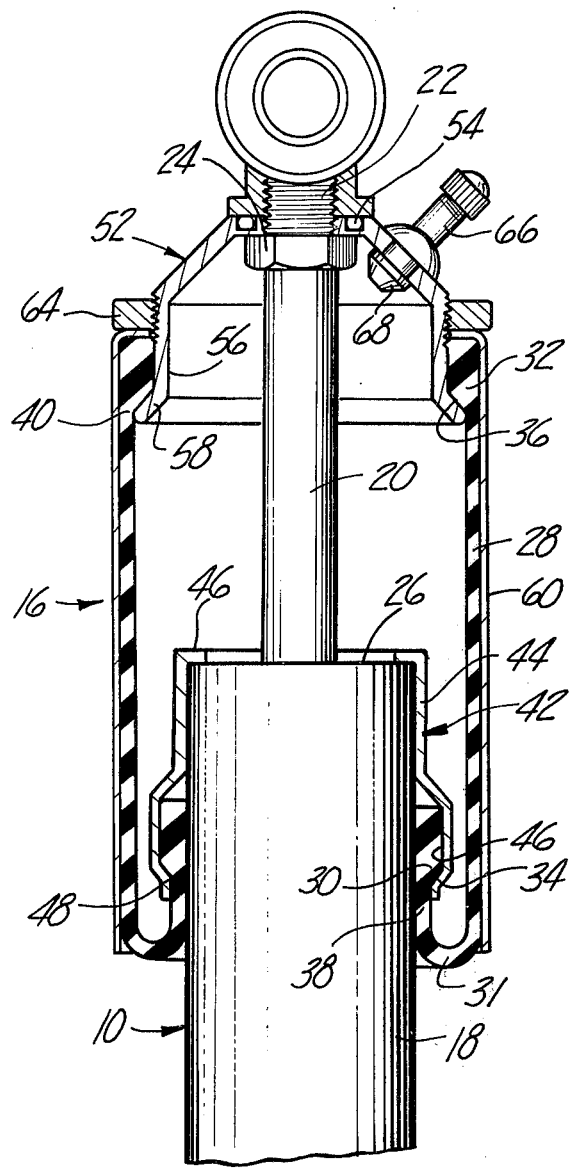
FIG. 2 is a fragmentary vertical cross sectional view of the structure of FIG. 1.

The shock body 18 is of conventional form, not specially designed to accept an air spring unit. Thus, as is illustrated in FIG. 2, the shock body 18 is assumed to have the illustrated circular cylindrical portion terminating in a flat end cap 26, with the piston rod 20 sliding through an aperture in that end cap 26. The exterior surface of the illustrated upper portion of the body 18 is assumed to be devoid of special grooves, indentations, lips or shoulders designed to specifically accommodate the addition of air spring assemblies.

The major element of the air spring assembly is a flexible, tubular, resilient boot 28 operating in the manner of a rolling-lobe diaphragm, as is well known in the air spring art. Boot 28 is provided with lower and upper enlarged lips or beads 30 and 32 each of which is substantially thicker than the thickness of the remainder of the body of the boot. The material therebetween is folded to define a rolling lobe 31. Beads 30 and 32 are further illustrated as having sloping transitions or shoulders 34 and 36 between the enlarged thickness of the bead portion and the free thickness of the remainder of the boot, at the neck portions of the beads at 38 and 40. To facilitate turning the boot inside out during manual assembly, boot 28 may be tapered, if desired. In one form, as an example, the tubular boot (with the beads directed inwardly) had an overall length of 7¼ inches, a bead body thickness of 0.200 inches, a bead height (excluding the tapered or beveled portion) of ½ inch, a free thickness of the wall of ⅛ inch, a slope of about 45° at the tapered chamfer 34 and 36 at the base of each bead, an outer diameter at the upper end (engaging cap 52) of 2⅜ inches and an outer diameter at the lower end (engaging shock body 18) of 1¾ inches.

Bead 30 of boot 28 is sealingly secured to the body 18 of the shock absorber by retainer sleeve 42. Retainer sleeve 42 includes a tubular circular cylindrical portion 44 having a diameter just slightly larger than the diameter of the upper circular cylindrical portion of body 18, that is, the minimum internal diameter of production retainer sleeves should desirably be slightly larger than the largest diameter of the circular cylindrical upper portion of the shock absorber bodies of a given nominal diameter with which the air spring assembly is to be associated. As will be seen, the retainer should be hand forceable into its illustrated position in relation to the body 18.

At its upper end, retainer sleeve 42 terminates in an inwardly directed flange 46 terminating in a central aperture through which piston rod 20 projects. Flange 46 is brought into abutment with end face 26 of body 18 and serves to limit the downward movement (in the illustrated attitude of the unit) of the sleeve 42 relative to the body 18 during installation.

Figure 3:
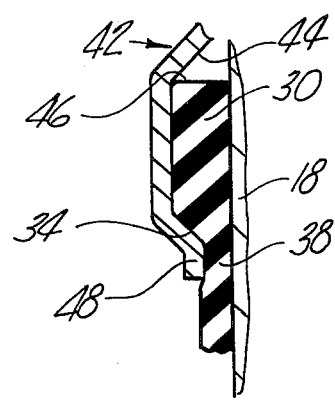
FIG. 3 is an enlarged view of a portion of the structure illustrated in FIG. 2.

Below the cylindrical section 44, sleeve 42 enlarges in diameter to define an enlarged annular cavity 46 to accept the thickness of the bead 30 disposed circumferentially of the body 18. At the lower portion of the cavity 46, the sleeve 42 slopes downwardly and inwardly in a configuration substantially matching the slope of the face 34 of the bead 30, and terminates in a circumferential clamping edge 48 bearing against the neck 38 of the bead 30 and pinching that neck against the adjacent portion of the circular cylindrical body 18. The clamping edge is an interference fit with the combination of the body 18 and the neck 38, that is, the inner diameter of the clamping edge 48 is smaller than the outer diameter of the tube 28 plus the free dual thickness of the neck portion 38 of the bead 30 when that neck portion is in surrounding abutment with the body 18. The interference fit should be sufficient to provide proper sealing between the neck portion 38 and the body 18 while yet not unduly inhibiting the installation of the combination of the bead 30 and the sleeve 42 on the body 18. As an example, with units in which the diameter of the body 18 was about an inch and a half, the inner diameter of the clamping edge 38 was selected to be about 0.008 inches less than the sum of the diameter of the body 18 and the two thicknesses of the boot body 28 in the region of the neck 38. As a result, the clamping edge 38 tends to indent and pinch the neck 38 against the body 18 as is illustrated in FIG. 3 of the drawings. It will be seen that the effect of pressure within the boot 28 will be in a sense to tend to result in the continuing engagement of the inwardly directed flange 46 with the end face 26 of the shock body 18, so that with that force, coupled with the frictional engagement in the region of the clamping edge 38, there is no need to permanently secure or lock the retainer sleeve 42 in position and it may be readily removed, if necessary at any time, to permit rebuilding of the air spring assembly or replacement of the shock absorber, or otherwise. It will be observed that those same pneumatic forces also tend to aid in maintaining a seal at the neck of the bead 38, since the force on the boot, resulting from the air pressure, tends to draw a thicker section of the bead into the clamping area.

The upper bead 32 of the boot 28 is sealingly secured to the assembly including piston rod 20 by means of a master cap 52. Cap 52 is centrally apertured to accept the threaded stud portion 22 of the piston rod 20 and is trapped between the nut or shoulder 24 and the top eye 14. An annular groove in the upper surface of the master cap 52, surrounding the central aperture therein, accepts an O-ring seal 54 to constitute a sealing means to prevent the escape of air through the central aperture in the master cap 52.

Master cap 52 includes a tubular circular cylindrical skirt portion 56 terminating at its lower end in a lip 58 which flares at an angle directed outwardly from the skirt 56 and downwardly towards the rolling lobe 31 illustratively at an angle of approximately 45°. The outer face of the skirt 56 of the cap 52 substantially conforms in shape to the abutting face of the bead 32, and the outer face of the flared lip 58 substantially conforms to the abutting face of the sloping portion 36 of the bead 32.

A circular cylindrical tubular shell 60 surrounds and supports the outer wall of the boot 28 and is provided with an inwardly directed flange 62 overlying the upper surface of the bead 32. The upper exterior surface of the skirt 56 is threaded to constitute a fastening means accepting portion, and a nut 64, constituting a fastening means, is threadedly engaged thereby and clamps flange 62 against the upper surface of the bead 32.

It will be observed that the neck of the bead 40 is pinched or clamped between the external face of the flared lip 58 and the adjacent inner face of the shell 60. The inner diameter of the shell 60 should be greater than the outer diameter of the flared lip 58 by an amount less than two thicknesses of the boot 28 in the region of the neck 40, in the manner previously discussed with reference to FIG. 3 of the drawings.

A master cap 52 is apertured to accept a valve assembly 66 of a type including a conical resilient portion 68 which may be forced through the aperture and which will expand therewithin, said valve assemblies being similar to the type commercially available for use with tubeless tires.

To assemble the rebuildable air spring assembly to a shock absorber, the boot 28 is first turned inside out so that the beads 30 and 32 and the sloping surfaces thereat are on the exterior of the bead surface. The bead 30 is then inserted within the cavity 46 in the retainer sleeve 42, with the remainder of the boot depending downwardly therefrom. Prior to or following the aforesaid operations, the shock top eye 14 and the shock lock nut 24 (if provided) are removed from the shock absorber. The inverted boot 28 and the retainer sleeve 42, assembled together as above described, are then inserted over the piston rod 20 and moved downwardly around the shock body 18. To simplify and facilitate assembly it is recommended that the outer upper surface of the shock body 18 be at least wetted and preferably wetted with a soap and water solution to create a temporary lubricating action. The retainer sleeve 42 is moved downwardly (in the illustrated attitude of the parts) over the shock body 18 until the inwardly directed flange 46 abuts the end face 26, as illustrated in FIG. 2. After rethreading shock lock nut 24 on threads 22 (if a lock nut is provided with the shock absorber), the master cap 52 is inserted over the threaded portion 22 and into abutment with the shoulder means at the remote end of the piston rod 20, which shoulder means may be in the form of the lock nut 24. The shock top eye or attachment portion 14 is then screwed upon the threads 22 to clamp the master cap 52 in position. The lowermost end of the boot is then flipped and folded upwardly into the configuration illustrated in FIG. 2 of the drawings, bringing the bead 32 over the flared lip 58 into the illustrated position. Outer shell 60 is then inserted from the top into a position in which its flange 62 rests upon bead 32. Nut 64 is then inserted over master cap 52 and is screwed on the threads on the skirt 56 to clamp flange 64 between that nut and the bead 32. Valve 66 is then popped through the aperture therefore and the assembly is ready for pressurization and use.

It will be perceived that a reverse procedure may be employed to disassemble the air spring assembly from the shock absorber to permit replacement of parts of the air spring assembly or to permit replacement of the shock absorber.

What is claimed is:

1. In a supplementary air spring unit for a shock absorber assembly having a body with a circular cylindrical end portion and an end face adjacent thereto, a piston rod projecting through the end face and carrying an attachment portion at one end thereof, the combination of a resilient tubular rolling-lobe boot having first and second beads at the respective ends thereof, means for securing said first bead to the circular cylindrical end portion of the shock absorber body, a master cap mountable on the piston rod and securable thereon by the attachment portion, said cap having a skirt portion including a lip extending outwardly from said skirt, means for securing said second bead in sealing egagement with said lip comprising fastening means directly engaging said cap in spaced proximity to said second bead, and a shell surrounding portions of said boot and having an inwardly directed lip trapped between and engaging each of said second bead and said fastening means, said fastening means securing said shell to said cap, and means for selectively introducing fluid under pressure to the cavity within said boot.

2. The combination of claim 1 in which said fastening means is selectively removable, and in which said shell and said bead may be readily disassembled from said cap upon selective removal of said fastening means.

3. The combination of claim 1 in which said cap includes a portion which is externally threaded and in which said fastening means comprises a nut threadedly engageable with said externally threaded portion of said cap.

4. The combination of claim 3 in which said shell and said second bead may be readily removed from said cap upon the selective removal of said nut.

5. The combination of claim 1 in which an area of said boot of preselected thickness is disposable between the edge of said lip and said shell and in which the distance between the edge of said lip and said shell is less than said preselected thickness.

6. The combination of claim 5 in which said lip flares at an angle directed outwardly from said skirt downwardly toward said rolling lobe, and in which a surface of said second bead is of mating configuration and engages said lip.

7. In a supplementary air spring unit for a shock absorber assembly having a body with a circular cylindrical end portion and an end face adjacent thereto, a piston rod projecting through the end face and carrying an attachment portion at one end thereof, the combination of a resilient tubular rolling-lobe boot having first and second beads at the respective ends thereof, a master cap mountable on the piston rod and securable thereto by the attachment portion, means for securing said second bead to said cap, and means for securing said first bead to and in engagement with the circular cylindrical end portion of the shock absorber body comprising a retainer sleeve having a circular cylindrical body portion having an internal diameter slightly larger than the diameter of the circular cylindrical end portion of the body of the shock absorber and slidably disposable thereon, said retainer sleeve further having an inwardly directed flange at one end engageable with the end face of the body of the shock absorber when said retainer sleeve is disposed on the body of the shock absorber, said retainer sleeve having an enlarged portion accepting said first bead and a clamping surface engageable with a portion of said boot adjacent said bead for trapping said portion of said boot against the circular cylindrical end portion of the shock absorber body, and means for selectively introducing fluid under pressure to the cavity within said boot.

8. The combination of claim 7 in which a portion of said boot of preselected thickness is disposable between said clamping edge of said retainer sleeve and the adjacent circular cylindrical portion of the shock absorber body and in which the distance between said clamping edge of said sleeve and the shock absorber body is less than said preselected thickness.

9. The combination of claim 8 in which upon the removal of fluid pressure from said cavity, said retainer sleeve is readily removable from the circular cylindrical portion of the body of the shock absorber.

10. The combination of claim 8 in which said cap has a skirt portion including a lip extending outwardly from said skirt, and further including means for securing said second bead in sealing engagement with said lip comprising fastening means engaging said cap in spaced proximity to said second bead, and a shell surrounding portions of said boot and having an inwardly directed lip trapped between said second bead and said fastening means.

11. The combination of claim 10 in which upon the removal of fluid pressure from said cavity, said retainer sleeve is readily removable from the circular cylindrical portion of the body of the shock absorber, in which said fastening means is selectively removable, and in which upon selective removal of said fastening means, said shell and said bead may be readily disassembled from said cap.

12. The combination of claim 10 in which said cap includes a portion which is externally threaded and in which said fastening means comprises a nut threadedly engageable with said externally threaded portion of said cap.

13. The combination of claim 10 in which an area of said boot of preselected thickness is disposable between the edge of said lip and said shell and in which the distance between the edge of said lip and said shell is less than preselected thickness.

14. The combination of claim 13 in which said lip flares at an angle directed outwardly from said skirt and downwardly toward said rolling lobe, and in which a surface of said second bead is of mating configuration and engages said lip.

15. The method of assembling a combination shock absorber and supplementary air spring unit including a shock absorber having a body member having a circular cylindrical portion near one end and an end face thereat, a piston rod extending axially outwardly from that end face and having an attachment means threaded on the free end of the piston rod and including a tubular resilient foldable diaphragm boot having enlarged beads at both ends which project in the same direction from the tubular body when the tubular body is in its free unassembled state, a retainer cap engageable with the circular cylindrical portion and with the end face of the shock absorber and having a bead clamping portion, a master cap engageable with the threaded portion of the piston rod and with the attachment means and having a skirt with an external bead-engaging area, a fastening means securable on the exterior of the master cap, and a shell disposable exteriorly of the diaphragm boot and having a flange trappable between one of the beads and the fastening means, which includes the steps of manipulating said diaphragm boot so that both bead portions thereof are directed outwardly of the tubular member, inserting one of the beads in a bead retaining portion of the retainer cap, training the diaphragm boot and the retainer cap over the shock absorber piston rod and over the end of the shock absorber body until the flange on the retainer cap engages the end face of the shock absorber body, placing the master cap on the threaded portion of the piston rod and securing the same thereon with the attachment means, folding the free portion of the boot and positioning the free bead into surrounding relationship with the master cap, placing the shell over the master cap and surrounding the boot with the flange thereof in engagement with the bead of the boot which is associated with the master cap, and placing the fastening means on the master cap to clamp the flange of the shell against the bead on the master cap.

16. The method of claim 15 in which the master cap is further apertured to accept an air valve, and further including the step of inserting the air valve in that aperture.

17. The method of claim 15 further including the steps of applying a temporary lubricant to the body of the shock absorber prior to the performance of said training step.

18. In a supplementary air spring unit for a shock absorber assembly having a body with a circular cylindrical end portion and an end face adjacent thereto, a piston rod projecting through the end face and carrying an attachment portion at one end thereof, the combination of a resilient tubular rolling-lobe boot having first and second beads at the respective ends thereof, means for securing said first bead to the circular cylindrical end portion of the shock absorber body, a master cap mountable on the piston rod and securable thereon by the attachment portion, said cap having a skirt portion including a lip extending outwardly from said skirt, means for securing said second bead in sealing engagement with said lip comprising fastening means directly engaging said cap in spaced proximity to said second bead, and a shell surrounding portions of said boot and having an inwardly directed lip trapped between and engaging each of said second bead and said fastening means, said fastening means securing said shell to said cap, means for selectively introducing fluid under pressure to the cavity within said boot, an area of said boot of preselected thickness being disposable between the edge of said lip and said shell, the distance between the edge of said lip and said shell being less than said preselected thickness, said lip flaring at an angle directed outwardly from said skirt and downwardly toward said rolling lobe, and a surface of said second bead being of mating configuration and engaging said lip.

19. In a supplementary air spring unit for a shock absorber assembly having a body with a circular cylindrical end portion and an end face adjacent thereto, a piston rod projecting through the end face and carrying an attachment portion at one end thereof, the combination of a resilient tubular rolling-lobe boot having first and second beads at the respective ends thereof, a master cap mountable on the piston rod and securable thereto by the attachment portion, means for securing said second bead to said cap, and means for securing said first bead to and in engagement with the circular cylindrical end portion of the shock absorber body comprising a retainer sleeve having a circular cylindrical body portion having an internal diameter slightly larger than the diameter of the circular cylindrical end portion of the body of the shock absorber and slidably disposable thereon, said retainer sleeve further having an inwardly directed flange at one end engageable with the end face of the body of the shock absorber when said retainer sleeve is disposed on the body of the shock absorber, said retainer sleeve having an enlarged portion accepting said first bead and a clamping surface engageable with a portion of said boot adjacent said bead for trapping said portion of said boot against the circular cylindrical end portion of the shock absorber body, means for selectively introducing fluid under pressure to the cavity within said boot, a portion of said boot of preselected thickness being disposable between said clamping edge of said retainer sleeve and the adjacent circular cylindrical portion of the shock absorber body, the distance between said clamping edge of said sleeve and the shock absorber body being less than said preselected thickness, said cap having a skirt portion including a lip extending outwardly from said skirt, and further including means for securing said second bead in sealing engagement with said lip comprising fastening means engaging said cap in spaced proximity to said second bead, and a shell surrounding portions of said boot and having an inwardly directed lip trapped between said second bead and said fastening means.

20. The method of assembling a combination shock absorber and supplementary air spring unit including a shock absorber having a body member having a circular cylindrical portion near one end and an end face thereat, a piston rod extending axially outwardly from that end face and having an attachment means threaded on the free end of the piston rod and including a tubular resilient foldable diaphragm boot having first and second enlarged beads at the respective ends which project in the same direction from the tubular body when the tubular body is in its free unassembled state, a retainer cap engageable with the circular cylindrical portion and with the end face of the shock absorber and having a bead clamping portion, a master cap engageable with the threaded portion of the piston rod and with the attachment means and having a skirt with an external bead-engaging area, a fastening means securable on the exterior of the master cap, and a shell disposable exteriorly of the diaphragm boot and having a flange trappable between one of the beads and the fastening means, which includes the steps of manipulating said diaphragm boot so that a first one of the beads thereof is directed outwardly of the tubular member, inserting said first one of the beads in a bead retaining portion of the retainer cap, training the diaphragm boot and the retainer cap over the shock absorber piston rod and over the end of the shock absorber body until the flange on the retainer cap engages the end of the shock absorber body, placing the master cap on the threaded portion of the piston rod and securing the same thereon with the attachment means, positioning the said second one of the beads into surrounding relationship with the master cap, placing the shell over the master cap and surrounding the boot with the flange thereof in engagement with said second one of the beads which is associated with the master cap, and placing the fastening means on the master cap to clamp the flange of the shell against said second one of the beads on the master cap.

* * * * *

UNITED STATES PATENT AND TRADEMARK OFFICE
CERTIFICATE OF CORRECTION

PATENT NO. : 4,022,448
DATED : May 10, 1977
INVENTOR(S) : Lehan James Reeder

It is certified that error appears in the above-identified patent and that said Letters Patent are hereby corrected as shown below:

Column 1, Line 10, delete "and" and insert therefor -- an --.

Column 1, Line 14, delete "simply" and insert therefor -- simple --.

Column 1, Line 15, delete "simply" and insert therefor -- simple --.

Column 1, Line 67, after "major" insert -- operative --.

Column 2, Line 32, after "retainer" insert -- sleeve --.

Column 5, Line 7, after "skirt" insert -- and --.

Column 8, Line 37, after "end" insert -- face --.

Signed and Sealed this thirtieth Day of August 1977

[SEAL]

Attest:

RUTH C. MASON
*Attesting Officer*

C. MARSHALL DANN
*Commissioner of Patents and Trademarks*